United States Patent
Luo et al.

(10) Patent No.: US 7,787,664 B2
(45) Date of Patent: Aug. 31, 2010

(54) RECOMPOSING PHOTOGRAPHS FROM MULTIPLE FRAMES

(75) Inventors: Jiebo Luo, Pittsford, NY (US); Phoury Lei, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1190 days.

(21) Appl. No.: 11/392,455

(22) Filed: Mar. 29, 2006

(65) Prior Publication Data

US 2007/0237421 A1 Oct. 11, 2007

(51) Int. Cl.
G06K 9/00 (2006.01)
(52) U.S. Cl. ............... 382/118; 382/257; 382/284; 382/293
(58) Field of Classification Search ............... 382/118, 382/284, 293, 195, 257
See application file for complete search history.

(56) References Cited

U.S. PATENT DOCUMENTS

| | | | | |
|---|---|---|---|---|
| 5,577,179 | A * | 11/1996 | Blank | 345/639 |
| 6,151,403 | A | 11/2000 | Luo | |
| 2002/0015514 | A1* | 2/2002 | Kinjo | 382/118 |
| 2003/0053663 | A1 | 3/2003 | Chen et al. | |
| 2003/0133599 | A1 | 7/2003 | Tian et al. | |
| 2006/0204055 | A1* | 9/2006 | Steinberg et al. | 382/118 |

OTHER PUBLICATIONS

Aseem Agarwala et al., Interactive Digital Photoimage, Conference Proceedings of 2004 ACM SIGGRAPH.

Paul Viola et al., Robust Real-Time Face Detection, International Journal of Computer Vision, vol. 57, No. 2, pp. 137-154, May 2004.

Paul Viola et al., Robust Real-Time Object Detection, Second International Workshop on Statistical and Computational Theories of Vision-Modeling, Leaning, Computing and Sampling, Vancouver, Canada, 2001.

H.J.A.M. Heijmans, "Morphological Filters", Proceedings of Summer School on Morphological Image and Signal Processing, Zakopane, Poland, 1995.

H.J.A.M. Heijmans, "Mathematical Morphology: Basic Principles", Proceedings of Summer School on on Morphological Image and Signal Processing, Zakopane, Poland, 1995.

W. Zhao et al., "Face Recognition: A Literature Survey", ACM Computing, vol. 35, No. 4, pp. 399-458, 2003.

B. Fasel et al., "Automatic Facial Expression Analysis: A Survey", Pattern Recognition, vol. 36, No. 1, pp. 259-275, 2003.

(Continued)

Primary Examiner—Jon Chang
(74) Attorney, Agent, or Firm—Raymond L. Owens

(57) ABSTRACT

A method for replacing a face in a first digital image with a face from a second digital image including automatically detecting one or more faces in the first digital image; identifying at least one target face from the detected faces that needs to be replaced; automatically detecting one or more faces in the second digital image; identifying at least one source face from the second image detected faces for replacing the target face; using features from the target and source faces to perform facial geometry and appearance corrections to the source face; and replacing the target face with the corrected source face and blending the corrected source face into the first digital image.

7 Claims, 5 Drawing Sheets

OTHER PUBLICATIONS

Cool Jeba: "tutorial" [Online]; Dec. 13, 2005, XP002447457; Retrieved from the Internet: URL: http://web.archive.org/web/20051213024415/http://www.coooljeba.com/tutorials/photoshop/changing_faces.html> {retrieved on Aug. 20, 2007] the whole document.

Saufnase.com: "Saufnase's tutorial on face swapping in photoshop" [Online] Oct. 8, 2004, XP002447458; Retrieved from the Internet: URL:http://www.saufnase.com/fark/tutorials/faceswap/default.htm> [retrieved on Jul. 20, 2007].

Microsoft Research: "Microsoft Research Group Shot" [Online] Feb. 4, 2006, XP002447459; Retrieved from the Internet: URL: http://web.archive.org/web/*/http://research.Microsoft.com/projects/GroupShot/GroupSotHelp.htm> [retrieved on Aug. 20, 2007].

* cited by examiner

RECOMPOSING PHOTOGRAPHS FROM MULTIPLE FRAMES

FIELD OF THE INVENTION

The invention relates generally to the field of digital image processing and, more particularly, to a method for recomposing a photograph from multiple frames.

BACKGROUND OF THE INVENTION

Seldom does a photograph record what he perceives with his eyes. Often, the scene captured in a photo is quite unexpected—and disappointing—compared to what we believe we have seen. A common example is catching someone with his eyes closed: we almost never consciously perceive an eye blink, and yet, there it is in the photo—"the camera never lies." Human's higher cognitive functions constantly mediate our perceptions so that in photography, very often, what you get is decidedly not what you perceive. "What you get," generally speaking, is a frozen moment in time, whereas "what you perceive" is some time-and spatially-filtered version of the evolving scene.

Digital photography can be used to create photographic images that more accurately convey our subjective impressions—or go beyond them, providing visualizations or a greater degree of artistic expression. One approach is to utilize multiple photos of a scene, taken with a digital camera, in which some aspect of the scene or camera parameters varies with each photo. A film camera could also be used, but digital photography makes the process of taking large numbers of exposures particularly easy and inexpensive. In addition, it is now possible for a digital camera to take a short video clip, which would provide multiple frames sampled at a very high frame rate, e.g., 30 fps, so it is highly likely that each part in a scene, for example a person's face, can be captured desirably at one point in time. These photographs are then pieced together, via an interactive system, to create a single photograph that better conveys the photographer's subjective perception of the scene. This process is sometimes called digital photomontage, after the traditional process of combining parts of a variety of photographs to form a composite picture, known as photomontage. It is also commonly referred to as image re-composition.

The primary technical challenges of photomontage are 1) to choose the frames containing desirable records of different parts, respectively; 2) to choose good seams between parts of the various images so that they can be joined with as few visible artifacts as possible; and 3) to reduce any remaining artifacts through a process that blends the image regions. While it is possible to perform this task using photo-editing software, such as PhotoShop™, it often involves firstly labor-intensive manual outlining of various parts and secondly extensive image manipulation. Above all, this task requires good knowledge of and working experience with digital image processing. Consequently, it is unrealistic for average consumers to accomplish image re-composition whenever they want to. Professional re-touching service is not always accessible and affordable.

To this end, it is beneficial to design a software tool that is easy to use for combining multiple images to create an ideal photograph. Aseem Agarwala et al., "Interactive Digital Photomontage", conference proceedings of 2004 ACM SIGGRAPH, describes an interactive, computer-assisted framework for combining parts of a set of photographs into a single composite picture. Their "digital photomontage" framework makes use of two techniques primarily: graph-cut optimization, to choose good seams within the constituent images so that they can be combined as seamlessly as possible; and gradient-domain fusion, a process based on Poisson equations, to further reduce any remaining visible artifacts in the composite. Also central to their framework is a suite of interactive tools that allow the user to specify a variety of high-level image objectives, either globally across the image, or locally through a painting-style interface. Image objectives are applied independently at each pixel location and generally involve a function of the pixel values (such as "maximum contrast") drawn from that same location in the set of source images. Typically, a user applies a series of image objectives iteratively in order to create a finished composite. The power of this framework lies in its generality for a wide variety of applications, including "selective composites" (for instance, group photos in which everyone looks their best), relighting, extended depth of field, panoramic stitching, clean-plate production, stroboscopic visualization of movement, and time-lapse mosaics. Unfortunately, this tool is clearly still not designed for an average consumer to use because the user often needs to select different parts from different images very carefully. In addition, the multiple frames used for creating the composite picture need to have approximately the same background and perspective such that the algorithm can align different parts. It is not possible to combine images taken from different perspectives or locations because registration of common parts cannot work.

Consumer focus group studies show that the highest valued image re-composition feature is one that creates a picture where anyone and everyone would look their best. Given the limited domain, it is possible to utilize models of the human faces to greatly reduce the amounts of user interaction and user knowledge required to perform the image-recomposition task, and perhaps completely automate the process using a computer, or a device with a CPU embedded, such as a digital camera (including a digital still camera, a digital camcorder, and a camera phone), a desktop computer with image/video editing/management software, and an online image/video server.

Consequently, it would be desirable to design a system that is easy to use, involves reduced amount of user interaction, and provide satisfactory results using multiple frames from either still or video capture that may or may not have been taken at the same location with the same camera perspective.

SUMMARY OF THE INVENTION

The present invention is directed to overcoming one or more of the problems set forth above. A method for replacing a face in a first digital image with a face from a second digital image, by:

a. automatically detecting one or more faces in the first digital image;

b. identifying at least one target face from the detected faces that needs to be replaced;

c. automatically detecting one or more faces in the second digital image;

d. identifying at least one source face from the second image detected faces for replacing the target face;

e. using features from the target and source faces to perform facial geometry and appearance corrections to the source face; and f. replacing the target face with the corrected source face and blending the corrected source face into the first digital image.

One important aspect of the present invention focuses on combining a plurality of frames to create a composite picture with reduced or no user interaction.

An important feature of the invention is that the method can be implemented in an image or video capture device as a new capture mode.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because many basic image and video processing algorithms and methods are well known, the present description will be directed in particular to algorithm and method steps forming part of, or cooperating more directly with, the method in accordance with the present invention. Other parts of such algorithms and methods, and hardware or software for producing and otherwise processing the video signals, not specifically shown, suggested or described herein can be selected from such materials, components and elements known in the art. In the following description, the present invention will be described as a method typically implemented as a software program. Those skilled in the art will readily recognize that the equivalent of such software can also be constructed in hardware. Given the system as described according to the invention in the following materials, software not specifically shown, suggested or described herein that is useful for implementation of the invention is conventional and within the ordinary skill in such arts.

While the present invention is applicable to multiple still pictures, it is instructive to note that the present invention can also utilize a digital video which is typically either a temporal sequence of frames, each of which is a two-dimensional array of red, green, and blue pixel values or an array of monochromatic values corresponding to light intensities. However, pixel values can be stored in component forms other than red, green, and blue, can be compressed or uncompressed. As used herein, the term digital image or frame refers to the whole two-dimensional array, or any portion thereof that is to be processed. In addition, the preferred embodiment is described with reference to a typical video of 30 frames per second, and a typical frame resolution of 480 rows and 680 columns of pixels, although those skilled in the art will recognize that digital videos of different frame rates and resolutions can be used with equal, or at least acceptable, success. With regard to matters of nomenclature, the value of a pixel of a frame located at coordinates (x,y), referring to the $x^{th}$ row and the $y^{th}$ column of the digital image, shall herein comprise a triad of values [r(x,y), g(x,y), b(x,y)] respectively referring to the values of the red, green and blue digital image channels at location (x,y). In addition, a frame is identified with a time instance t.

Figure 1:
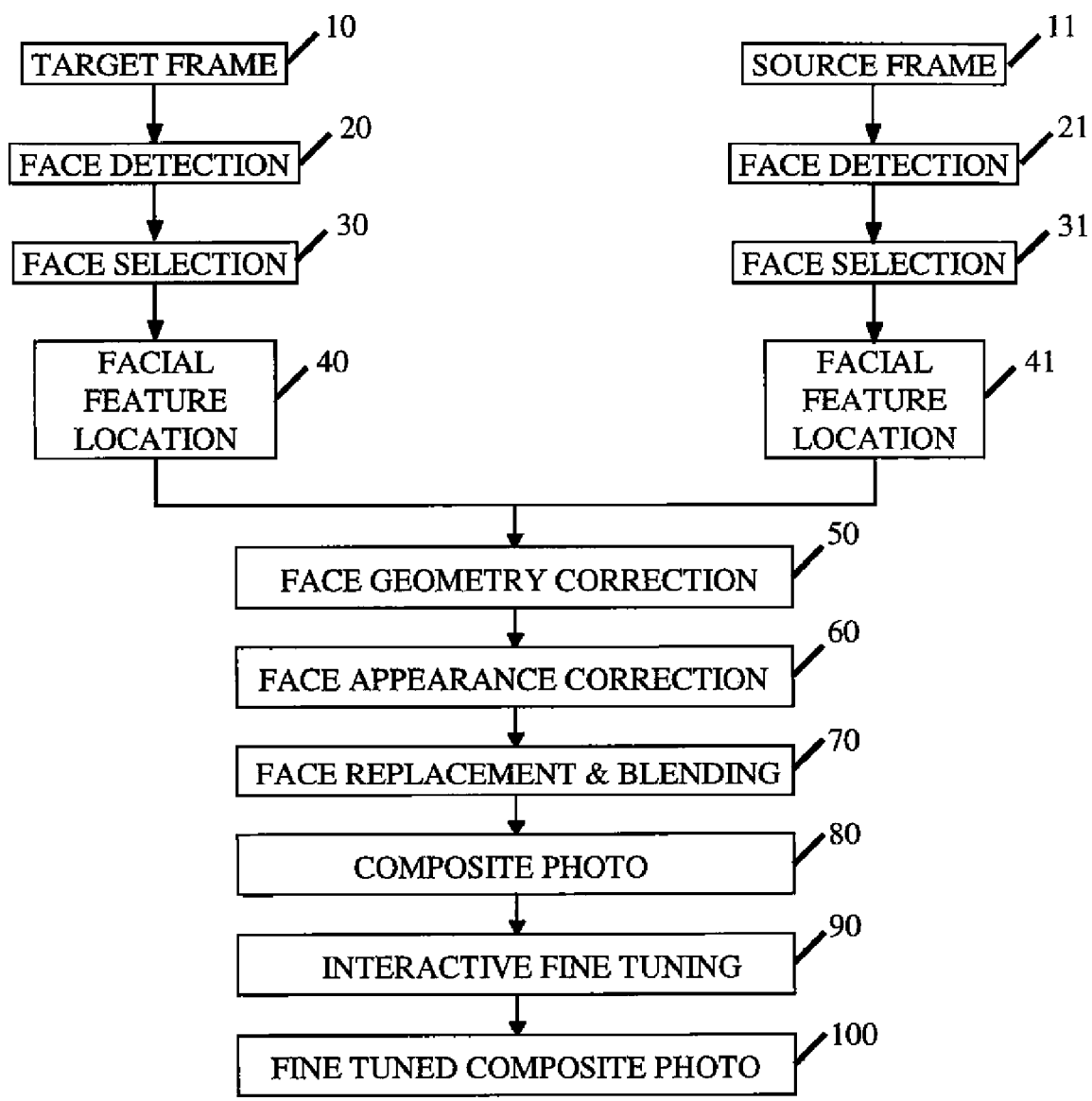
FIG. 1 is a block diagram illustrating an overview of the image recomposition method according to the present invention.

Referring to FIG. 1, there is shown an overview block diagram of the present invention. An input target frame 10 first undergoes face detection 20 to find a plurality of faces present in the image. Based on the results of face detection, a face that needs to be replaced ("target face") is identified through face selection 30, and then processed by facial feature location 40 to produce outlines of the face contour and facial features (including eyes, eyebrows, nose, and mouth). Similarly, an input source frame 11 also first undergoes face detection 21. Based on the results of face detection, a face that one wishes to use to replace the other face ("source face") is identified through face selection 31, and then processed by facial feature location 41 to produce outlines of the face contour and facial features. Note that even though in most cases the two selected faces belong to the same person, the present invention allows selecting faces belonging to different people.

Because the two selected faces do not necessarily have the same pose or size, face geometry correction 50 is performed on the source face. Upon geometric correction, face appearance correction 60 is then performed on the source face to ensure a good match between the source face and the target face in brightness, contrast, and color tone. Next, the pixels in the corrected source face are copied and pasted over the target face in a face replacement and blending step 70, which also include necessary boundary blending to ensure a seamless composite photo 80. In some cases when the automatic processing does not produce a satisfactory result, interactive fine tuning 90 is used to create a fine-tuned composite photo 100.

Face detection 20 is implemented following the method by P. Viola and M. Jones, "Robust Real-Time Face Detection", International Journal of Computer Vision, Volume 57, May 2004, Pages: 137-154. Those skilled in the art can use many of the alternative face detection methods.

Facial feature finding 40 is implemented according to the method disclosed by S. Chen and M. Bolin, US20030053663 A1, "Method and computer program product for locating facial features". This method includes the steps of detecting iris pixels in the image, clustering the iris pixels, and selecting at least one of the following schemes to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image. The method applied to identify eye positions is selected on the basis of the number of iris pixel clusters, and the facial features are located using the identified eye positions.

Figure 3:
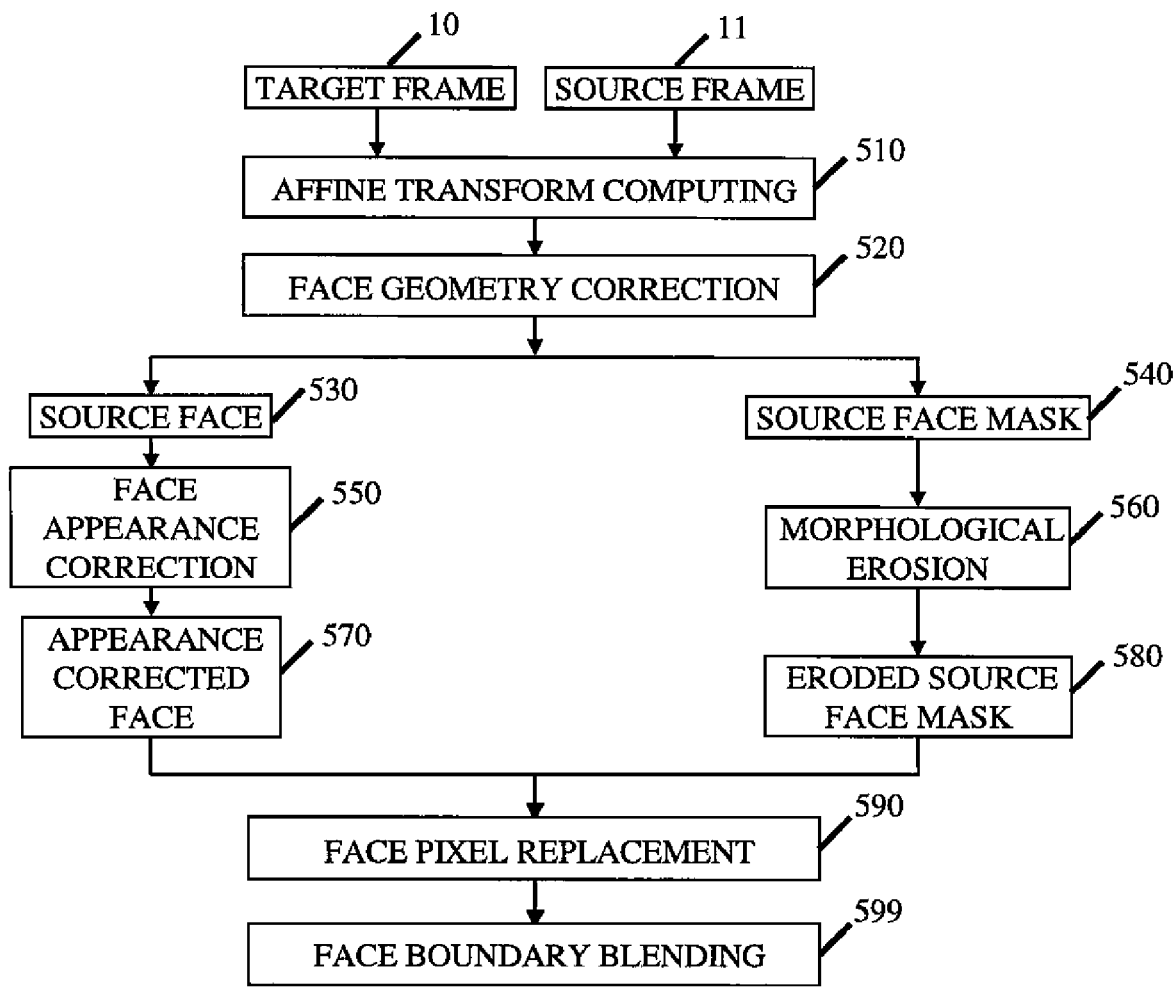
FIG. 3 is a block diagram illustrating further detail of the present invention.

Referring to FIG. 3, more details are provided for steps 50, 60, and 70. Once the target face and the source face are identified and the corresponding facial features are located, a preferred embodiment of the present invention uses the eye coordinates, namely left target eye center ($X_T^L$, $Y_T^L$), right target eye center ($X_T^R$, $Y_T^R$), left source eye center ($X_S^L$, $Y_S^L$), right source eye center ($X_S^R$, $Y_S^R$), to determine a geometric transform that would transform the source eye to the target eye in an affine transform computing step 510. The affine transform accounts for translation, rotation, scaling, and shear between the two faces.

The general affine transformation is commonly written in homogeneous coordinates as shown below:

$$\begin{vmatrix} x_2 \\ y_2 \end{vmatrix} = A \times \begin{vmatrix} x_1 \\ y_1 \end{vmatrix} + B$$

By defining only the B matrix, this transformation can carry out pure translation:

$$A = \begin{vmatrix} 1 & 0 \\ 0 & 1 \end{vmatrix}, B = \begin{vmatrix} b_1 \\ b_2 \end{vmatrix}$$

Pure rotation uses the A matrix and is defined as (for positive angles being clockwise rotations):

$$A = \begin{vmatrix} \cos(\theta) & -\sin(\theta) \\ \sin(\theta) & \cos(\theta) \end{vmatrix}, B = \begin{vmatrix} 0 \\ 0 \end{vmatrix}$$

In image coordinates, the y axis goes downward. Rotation formula can be defined for when they axis goes upward.

Similarly, pure scaling is:

$$A = \begin{vmatrix} \alpha_{11} & 0 \\ 0 & \alpha_{22} \end{vmatrix}, B = \begin{vmatrix} 0 \\ 0 \end{vmatrix}$$

Since the general affine transformation is defined by 6 constants, it is possible to define this transformation by specifying the new output image locations $(x_2,y_2)$ of any three input image coordinate $(x_1,y_1)$ pairs. In practice, many more points are measured, for example a combination of the corresponding facial feature points including the eye centers, eye corners, eye brows, nose, and the mouths, and a least squares method is used to find the best fitting transform. In an embodiment of the present invention, the translation, rotation, and scaling are determined using the pairs of the eye coordinates, namely left target eye center $(X_T^L, Y_T^L)$, right target eye center $(X_T^R, Y_T^R)$, left source eye center $(X_S^L, Y_S^L)$, and right source eye center $(X_S^R, Y_S^R)$. Specifically, the scaling factor is computed as the ratio of the inter-eye distances in the target and source faces, the rotation angle is computed from the intra-eye lines. Alternatively as mentioned above, one can use other facial features, or any combinations, as landmarks to determine the most suitable geometric transform.

The affine transform is applied to the source face and the result of the face geometry correction 520 (same as 50 in FIG. 1) is a geometrically corrected source face, which matched closely to the target face in size and pose. The geometrically corrected source face consists of two parts, which are the pixel values in the source face 530 within the face outline and a companion face mask 540. Each part will be processed separately. The face mask is a convenient way to label which pixels are considered in the corresponding face: a value of 1 in the mask indicates a face pixel while a value of 0 in the mask indicate a non-face pixel. In the present invention, the face and its mask are both stored in two separate images of the same size.

The pixel values in the source face 530 also need to undergo face appearance correction 550 (same as 60 in FIG. 1), where the overall brightness, contrast and color tone of the source face are adjusted to match those of the target face. In one embodiment of the present invention, the means and standard deviations of the pixel values for the target and source faces are computed, respectively, for the three color channels.

$$MEAN_{T,k} = \frac{1}{N_T} \sum_{(x,y) \in T} f(x,y,k) \quad \text{for } k = r, g, b$$

$$STD_{T,k} = \frac{1}{N_T} \sum_{(x,y) \in T} [f(x,y,k) - MEAN_{T,k}]^2 \quad \text{for } k = r, g, b$$

where $N_T$ is the total number of pixels in the target face T.

$$MEAN_{S,k} = \frac{1}{N_S} \sum_{(x,y) \in S} f(x,y,k) \quad \text{for } k = r, g, b,$$

$$STD_{S,k} = \frac{1}{N_S} \sum_{(x,y) \in S} [f(x,y,k) - MEAN_{S,k}]^2 \quad \text{for } k = r, g, b,$$

where $N_S$ is the total number of pixels in the source face S.

To match the two faces in their appearance, the pixel values $f_s(x,y,k)$, in the source face are transformed to $$f'_s(x,y,k) = [f_s(x,y,k) - MEAN_{S,k}]/STD_{S,k} * STD_{T,k} + MEAN_{T,k}$$

And the result is an appearance corrected source face 570.

Meanwhile, the source face mask 540 is processed in preparation for the subsequent face replacement and blending 70. Recall that the method by Agarwala et al. makes use of two techniques for region replacement and blending: graph-cut optimization, to choose good seams within the constituent images so that they can be combined as seamlessly as possible; and gradient-domain fusion, a process based on Poisson equations, to further reduce any remaining visible artifacts in the composite. Both are computationally intensive procedures. In the scope of the present invention, the specific domain of face replacement provides an opportunity to accomplish face replacement and blending in a simple and effective fashion. In a preferred embodiment of the present invention, the source face mask 540 is reduced through a morphological erosion procedure 560 such that the boundary of the eroded source face mask 580 falls in the smooth skin region, away from the face contour and away from the facial features. This design ensures that the boundary of the corrected source face fall in the skin regions of the target face during face pixel replacement 590, when the eyes are aligned between the two faces, thus making the seam least visible. Furthermore, the subsequent face boundary blending 599 is performed around the boundary pixels indicated by the eroded source face mask for blending the corrected source face into the target image. Because blending also occurs in the smooth skin region, it can be achieved using a simple Gaussian blurring kernel without producing visible artifacts. Detail for morphological erosion can be found in H. J. A. M. Heijmans, "Morphological filters", Proceedings of Summer School on Morphological Image and Signal Processing, Zakopane, Poland, 1995. A reasonable choice for the erosion kernel is a disk of 5 pixels in its diameter.

Still referring to FIG. 1, for interactive fine tuning 90, a plurality of sliders on a pop-up panel is provided. In a preferred embodiment of the present invention, the degrees of freedom for fine tuning include brightness, contrast, color along the magenta-green axis ($c_1 = r - 2*g + b$), color along the red and blue axis ($c_2 = r - b$), face size, horizontal translation, vertical translation, and a smudge kernel for smoothing the boundaries. Each slider allows a user to fine tune the quality of the composite image in the corresponding aspect, using the parameters or settings automatically determined in steps 50, 60, and 70 as the starting points (thus significantly reducing the knowledge and operations required on the user's part). In addition, an interface is provided to allow a user to click on the two eyes of a subject in case automatic face detection fails to find the face. The facial feature finding module in the present invention is capable of using the clicked eye positions to locate the face contour and other facial features.

Figure 2:
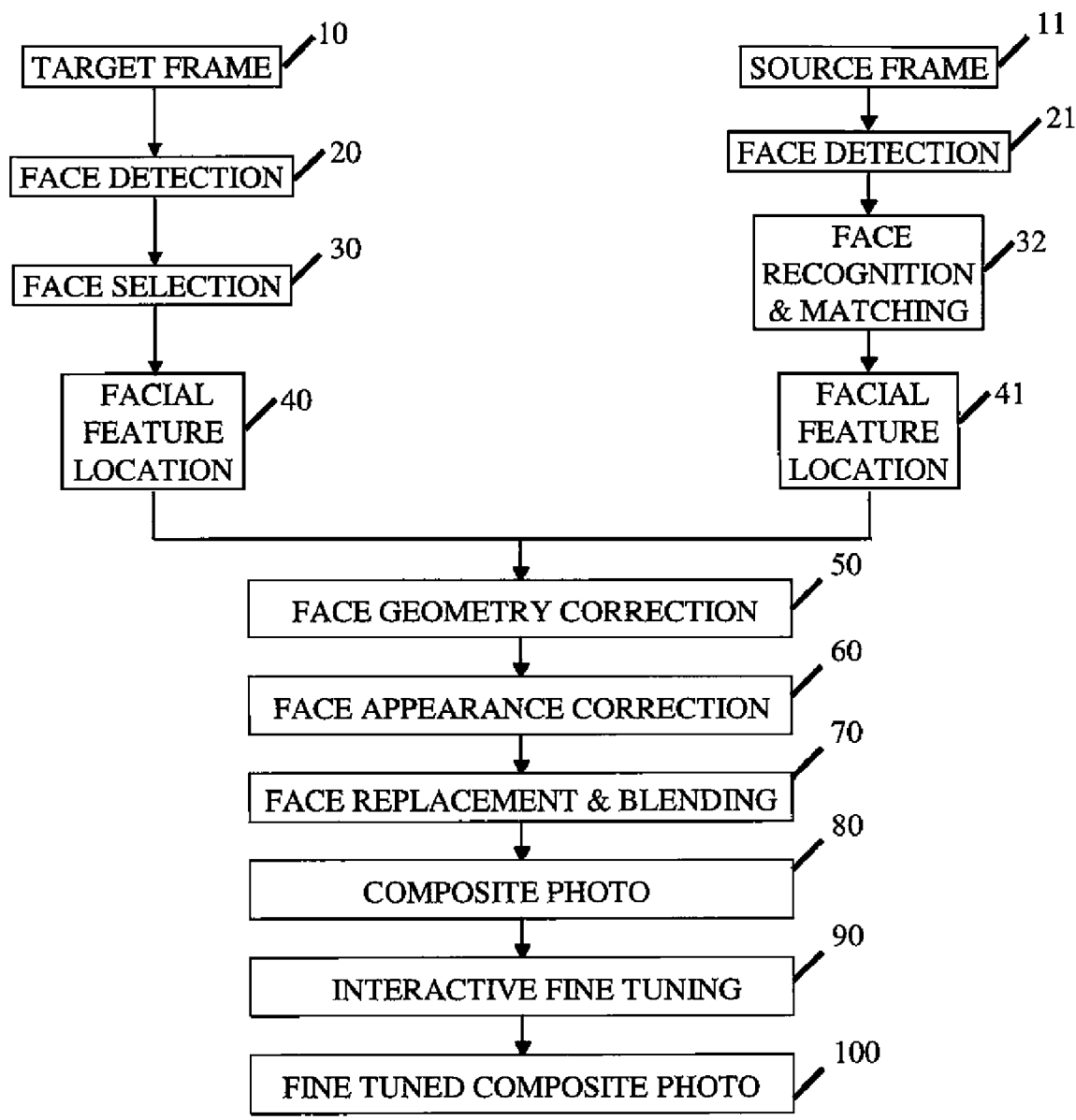
FIG. 2 is a block diagram illustrating an overview of a variation of the image recomposition method according to the present invention.

Referring to FIG. 2, there is shown a variant of the present invention, with an increased level of automation. The main difference is that instead of face selection 31, automatic face recognition and matching 32 is performed on the source frame 11 to identify the corresponding source face to be used to replace the target face. In particular, a detected but unassigned face in the source frame is compared to the target face to generate a similarity score. The comparison is done by a face recognition program, such as the Visionics FaceIt™ Software Developer's Kit (SDK). The similarity score(s) are compared to a predetermined threshold, and if the score is above the predetermined threshold, a match is found between the target face and the source face. Alternatively, the face with the highest similarity score is considered as the best match to the target face. Those skilled in the art can use many of the alternative face recognition methods (see W. Zhao, R. Chellappa, P. J. Phillips and A. Rosenfeld, "Face Recognition: A literature survey", ACM Computing, Vol. 35, No. 4, pp. 399-458, 2003) without deviating from the scope of the present invention.

Figure 4:
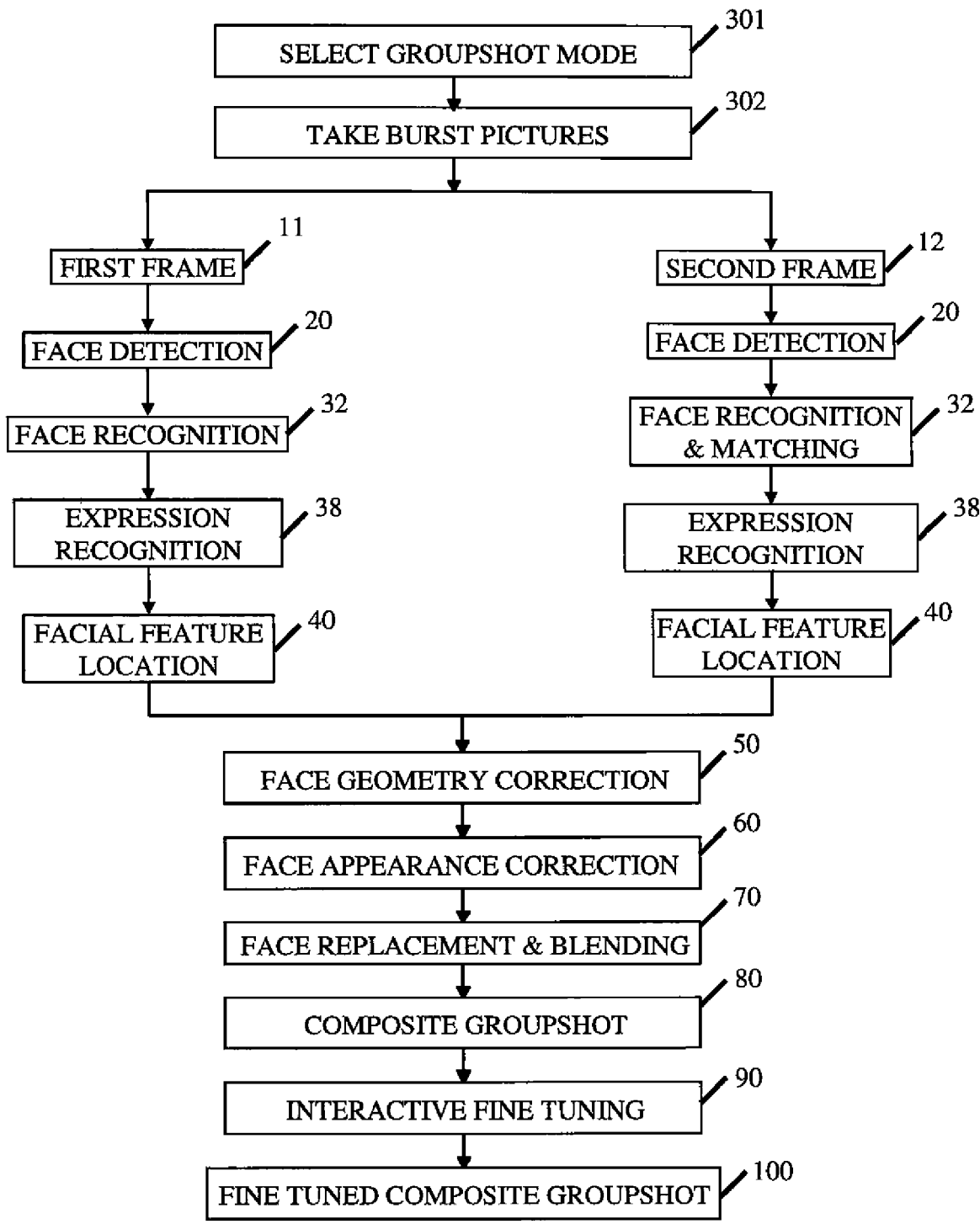
FIG. 4 is a block diagram illustrating an in-camera feature for "group shot" according to the present invention.

The methodology described above can be implemented in a digital camera as a novel function called "group shot" (similar to the "portrait" mode commonly found in many cameras). The block diagram of "group shot" mode is illustrated in FIG. 4. First, the camera is set to the "group shot" mode 301. When the shutter is pressed, the camera takes a series of (two or more) pictures in quick succession or a burst 302. Assuming two pictures are taken, a first input frame 11 first undergoes face detection 20 to find a plurality of faces present in the image. Similarly, a second input frame 12 also first undergoes face detection 20. Face recognition 32 is then performed on both the first frame and the second frame to establish the correspondence between faces. Next, expression recognition 38 is performed on every pair of the matching faces to determine if the expression in one of the images is better than the other to the extent that it would desirable to keep only one of them. In this case, the related faces are processed by facial feature location 40.

Typically, the first frame in the series is used as the target frame because it was taken at the moment the photographer pressed the shutter. Alternatively, the frame that contains the majority of the desired faces is treated the same way as the target frame, and the other frame or frames are treated as the source frame or source frames. A face to be replaced is a "target face", while a face that will be used to replace the other face is a "source face".

In one embodiment of the present invention, expression recognition includes recognition of closed or blinking eyes. In one embodiment of the present invention, open or closed eyes are recognized using template matching or cross correlation. The template is an image of an open eye. The cross-correlation between the template and an eye in the target or source face is computed by summing up the product of the corresponding pixel values between the template and the actual eye region. It is expected that an open eye would produce a high response in cross-correlation score while a closed eye would generate a low response, compared to a predetermined threshold (for example, 0.5). Note that through facial feature location 40, each eye is already segmented and thus can be resized and rotated for matching against the template. For better accuracy, two separate eye templates are used for the right and left eyes, although it is acceptable to use a single eye template for both. To normalize the template, the average pixel value for the entire template image is subtracted from each pixel value and the resulting pixel value is divided by the standard deviation of the entire template image for obtaining a normalized pixel value. The resulting template therefore has a mean value of zero and a unit variance. The same normalization is applied to the eye region identified by facial feature location 40. It is advantageous to use normalized cross-correlation because it is more robust against brightness and contrast variations. Detail on a more sophisticated method for eye template matching is taught by Luo, U.S. Pat. No. 6,151,403, "A method for automatic detection of human eyes in digital images".

For more sophisticated expression recognition in terms of smile, neutral, hate, anger, sad, and so on, one can use any of the methods discussed by B. Fasel, et al, Automatic Facial Expression Analysis: A Survey, *Pattern Recognition*, 36, pp 259-275, 2003.

Because the two selected faces do not necessarily have the same pose or size, face geometry correction 50 is performed on the source face. Upon geometric correction, face appearance correction 60 is then performed on the source face to ensure a good match between the source face and the target face in brightness, contrast, and color tone. Next, the pixels in the corrected source face are copied and pasted over the target face in a face replacement and blending step 70, which also include necessary boundary blending to ensure a seamless composite photo 80, i.e., the best "group shot". Note that this process is repeated for every pair of matching faces (belonging to the same subject). In some cases when the automatic processing does not produce a satisfactory result, interactive fine tuning 90 is used to create a fine-tuned composite group shot 100. The composite group picture is stored instead or in addition to the burst pictures.

Figure 5:
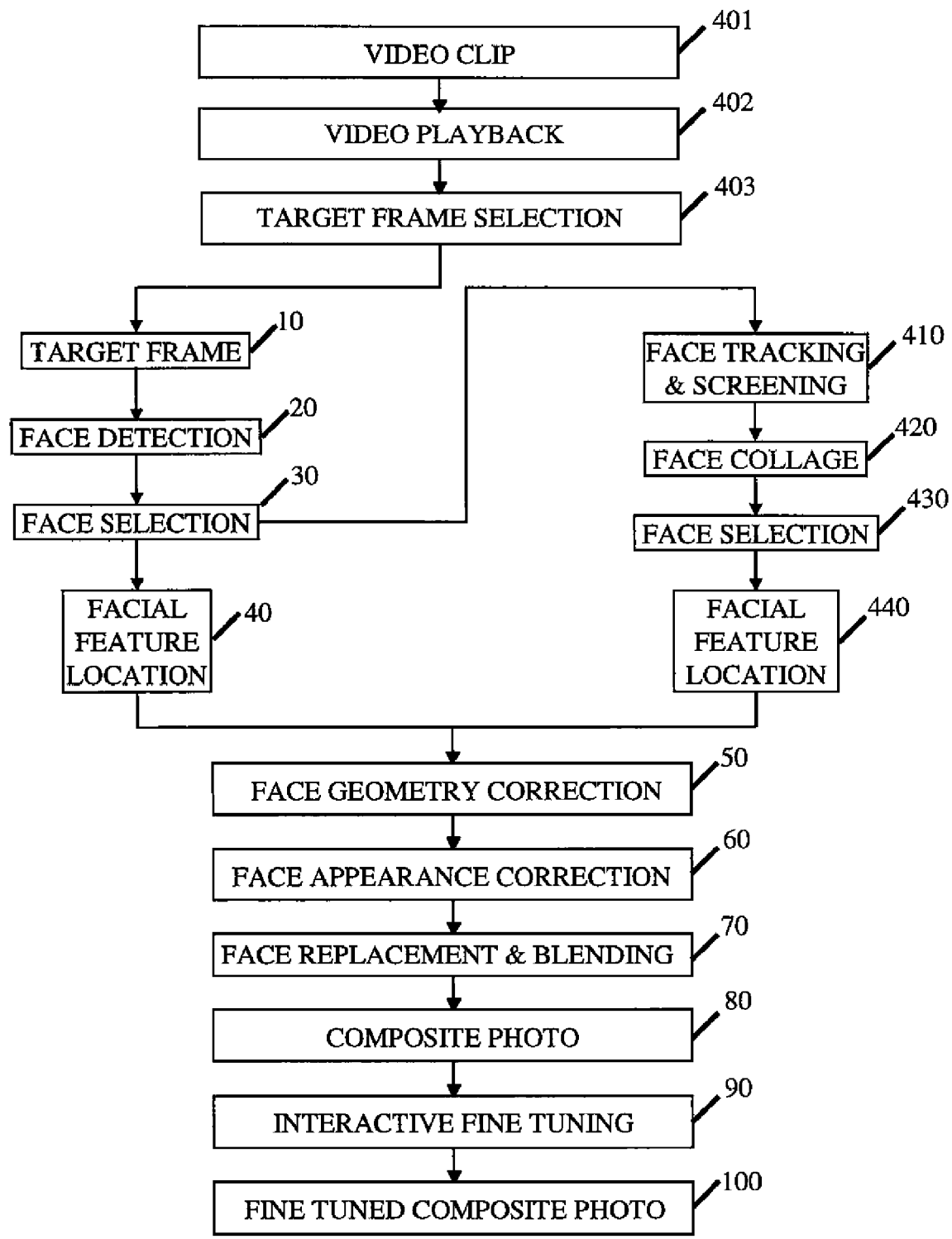
FIG. 5 is a block diagram illustrating a variation of the image recomposition method for video clips according to the present invention.

Referring to FIG. 5, there is shown a block diagram of another variant of the present invention, which can be implemented either in software or in a digital camera. An input video clip 401 is first captured. A display (computer monitor or camera LCD display) allows video playback 402. A target frame is selected 403 in an interactive fashion. The target frame 10 undergoes face detection 20, and a face that needs to be replaced is selected 30 and the facial features on the selected face are located 40. Next, the frames in the video clip are screened 410 for the same face through face tracking or face recognition. The screening process would eliminate redundant faces that look similar, as well as faces with closed/blinking eyes and other unflattering expressions. The resulted faces, of desirable expressions, form a face collage 420 of usable source faces. A face will be selected 430 as the source face from the face collage 420 and the facial features on the selected source face are located 440.

Because the two selected faces do not necessarily have the same pose or size, face geometry correction 50 is performed on the source face. Upon geometric correction, face appearance correction 60 is then performed on the source face to ensure a good match between the source face and the target face in brightness, contrast, and color tone. Next, the pixels in the corrected source face are copied and pasted over the target face in a face replacement and blending step 70, which also include necessary boundary blending to ensure a seamless composite photo 80. In some cases when the automatic processing does not produce a satisfactory result, interactive fine tuning 90 is used to create a fine-tuned composite photo 100.

The present invention has been described with reference to a preferred embodiment. Changes can be made to the preferred embodiment without deviating from the scope of the present invention. Such modifications to the preferred embodiment do not significantly deviate from the scope of the present invention.

PARTS LIST

10 Target Frame
11 Frame
12 Second Frame
20 Face Detection
21 Face Detection
30 Face Selection
31 Face Selection
32 Face Recognition & Matching
38 Expression Recognition
40 Facial Feature Location
41 Facial Feature Location
50 Face Geometry Correction
60 Face Appearance Correction
70 Face Replacement & Blending
80 Composite Photo
90 Interactive Fine Tuning
100 Fine Tuned Composite Photo
301 Select Group Shot Mode
302 Take Burst Pictures
401 Video Clip
402 Video Playback
403 Target Frame Selection
410 Face Tracking & Screening
420 Face Collage
430 Face Selection
440 Facial Feature Location
510 Affine Transform Computing
520 Face Geometry Correction
530 Source Face
540 Source Face Mask
550 Face Appearance Correction
560 Morphological Erosion
570 Appearance Corrected Face
580 Eroded Source Face Mask
590 Face Pixel Replacement
599 Face Boundary Blending

What is claimed is:

1. A method for producing a composite photo by replacing a face in a first digital image with a face from a second digital image comprising:
   a. automatically detecting one or more faces in the first digital image;
   b. identifying at least one target face from the detected faces that needs to be replaced;
   c. automatically detecting one or more faces in the second digital image;
   d. identifying at least one source face from the second image detected faces for replacing the target face;
   e. automatically locating facial features in both the first and second digital images;
   f. using the located facial features from the target and source faces to perform facial geometry correction using facial features located on the target face and the source face to produce a geometrically corrected source face, and perform appearance correction on the geometrically corrected source face under a plurality of automatically determined parameters to produce a corrected source face;
   g. replacing the target face with the corrected source face and blending the corrected source face into the first digital image by:
      i. producing a source face mask for the corrected source face;
      ii. producing an eroded source face mask;
      iii. replacing pixels in the target face with pixels in the corrected source face based on the eroded source face mask; and
      iv. blending the corrected source face into the first image around the boundary pixels indicated by the eroded source face mask; and
   h. producing the composite photo from the corrected source face image.

2. The method according to claim 1 wherein step d includes using facial features in the target face to identify the source face through automatic face recognition.

3. The method according to claim 1 further including
   i. interactively fine tuning the replaced source face in the composite photo using the facial features and parameters automatically determined in steps e and f as starting points.

4. The method according to claim 3 further including
   i. providing an interface to allow a user to click on two eyes of a subject in case automatic face detection fails to find the face; and
   ii. using the user clicked eye positions to locate face contour and other facial features.

5. A method for producing a composite photo from a series of frames captured by a video capture device, comprising:
   a. selecting a frame from the series of frames;
   b. automatically detecting one or more faces from the selected frame;
   c. automatically identifying at least one target face from the detected group faces that needs to be replaced;
   d. automatically detecting faces in other frames captured by the video capture device;
   e. using facial features in the target face to identify source faces in the other frames through automatic face recognition;
   f. producing a collage of usable source faces from the identified source faces in the other frames;
   g. selecting a source face from the collage of useable source faces;
   h. using features from the target and the selected source face to perform facial geometry and appearance corrections to the selected source face under a plurality of automatically determined parameters; and
   i. replacing the target face with the corrected source face and blending the corrected source face into the first digital image to form the composite group photo.

6. The method of claim 5 further including
   j. interactively fine tuning the replaced source face using the parameters automatically determined in steps e and f as starting points.

7. A method for producing a composite photo by replacing a face in a first digital image with a face from a second digital image comprising:
   a. automatically detecting one or more faces in the first digital image by:
      i. providing an interface to allow a user to click on two eyes of a subject in case automatic face detection fails to find the face; and ii. using the user clicked eye positions to locate face contour and other facial features,
b. identifying at least one target face from the detected faces that needs to be replaced;
c. automatically detecting one or more faces in the second digital image;
d. identifying at least one source face from the second image detected faces for replacing the target face;
e. automatically locating facial features in both the first and second digital images;
f. using the located facial features from the target and source faces to perform facial geometry and appearance corrections to the source face under a plurality of automatically determined parameters to produce a corrected source face;
g. replacing the target face with the corrected source face and blending the corrected source face into the first digital image by interactively fine tuning the replaced source face in the composite photo using the facial features and parameters automatically determined in steps e and f as starting points; and
h. producing the composite photo from the corrected source face image.

* * * * *